(12) United States Patent
Kohler

(10) Patent No.: US 6,409,438 B1
(45) Date of Patent: Jun. 25, 2002

(54) METHOD AND SYSTEM FOR POSITIONING OF A CARRIER FOR WORK PIECES

(75) Inventor: Dietmar Kohler, Dornbirn (AT)

(73) Assignee: Heron Sondermaschinen und Steuerungen GmbH, Dornbirn (AT)

( * ) Notice: Subject to any disclaimer, the term of this patent is extended or adjusted under 35 U.S.C. 154(b) by 0 days.

(21) Appl. No.: 09/399,999

(22) Filed: Sep. 20, 1999

(30) Foreign Application Priority Data

Sep. 18, 1998 (DE) .......................................... 198 42 774

(51) Int. Cl.[7] ................................................. B23Q 7/00
(52) U.S. Cl. .......................... 409/131; 29/33 P; 29/559; 409/225; 198/345.3; 104/251; 104/252
(58) Field of Search ................................. 29/33 P, 559; 409/225, 131; 198/345.1, 345.2, 345.3, 346.1, 346.2, 346.3; 104/251, 252

(56) References Cited

U.S. PATENT DOCUMENTS

| | | | |
|---|---|---|---|
| 3,696,756 A | * 10/1972 | Elmore et al. | 104/251 |
| 3,934,701 A | * 1/1976 | Mooney et al. | |
| 4,603,639 A | * 8/1986 | Sleep | 104/252 |
| 4,646,649 A | * 3/1987 | Thatcher et al. | 104/252 |
| 4,703,843 A | * 11/1987 | Dixon | 198/345 |

FOREIGN PATENT DOCUMENTS

| | | |
|---|---|---|
| DE | 36 28 760 | 3/1987 |
| DE | 37 14 716 | 11/1988 |
| DE | 39 30 371 | 3/1991 |
| DE | 43 03 916 | 8/1994 |
| DE | 195 32 281 | 3/1997 |

* cited by examiner

Primary Examiner—David P. Bryant
Assistant Examiner—Eric Compton
(74) Attorney, Agent, or Firm—Knobbe, Martens, Olson & Bear, LLP

(57) ABSTRACT

An apparatus for positioning a workpiece carrier in a machining station includes at least one positioning device. The workpiece carrier is movable on a rail system and one or more machining stations are arranged along the rail system for machining a workpiece arranged on the workpiece carrier. The at least one positioning device is arranged in an area of the machining station and has fixtures for positioning and high-precision retention of the workpiece carrier with respect to a stationary reference surface. The positioning device further includes fixtures for decoupling the workpiece carrier from the rail system, and a deceleration and acceleration device for the workpiece carrier.

16 Claims, 10 Drawing Sheets

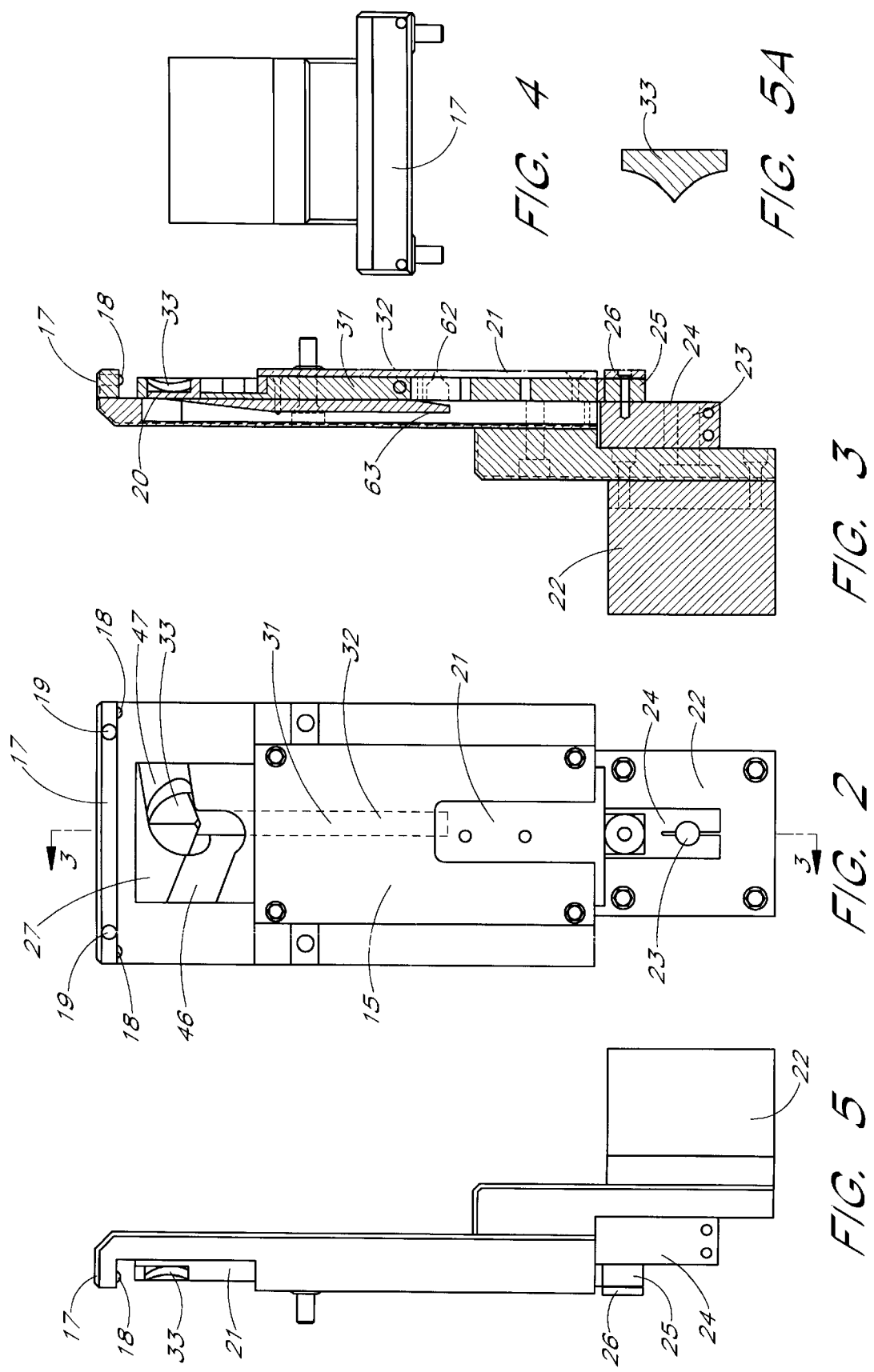

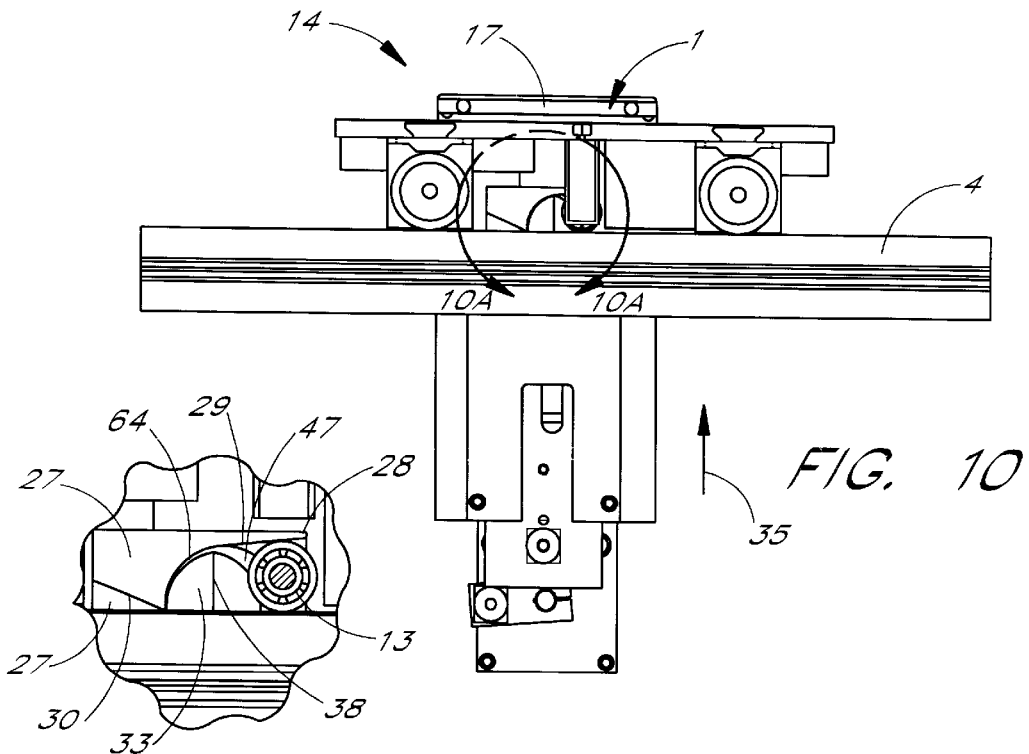
FIG. 10
FIG. 10A
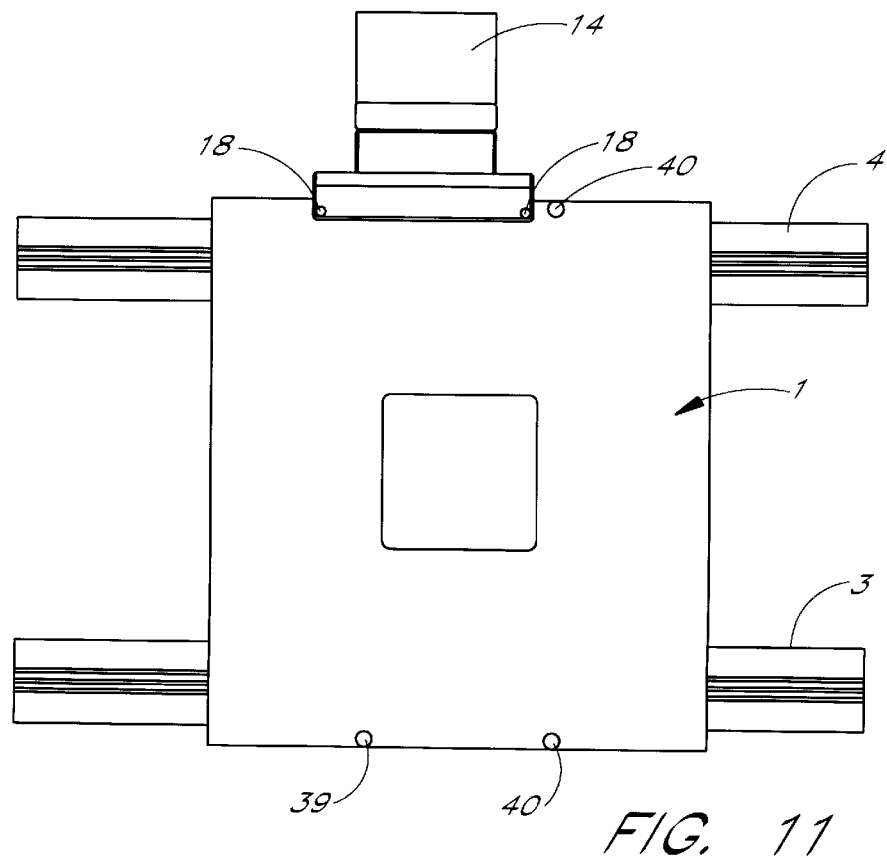
FIG. 11

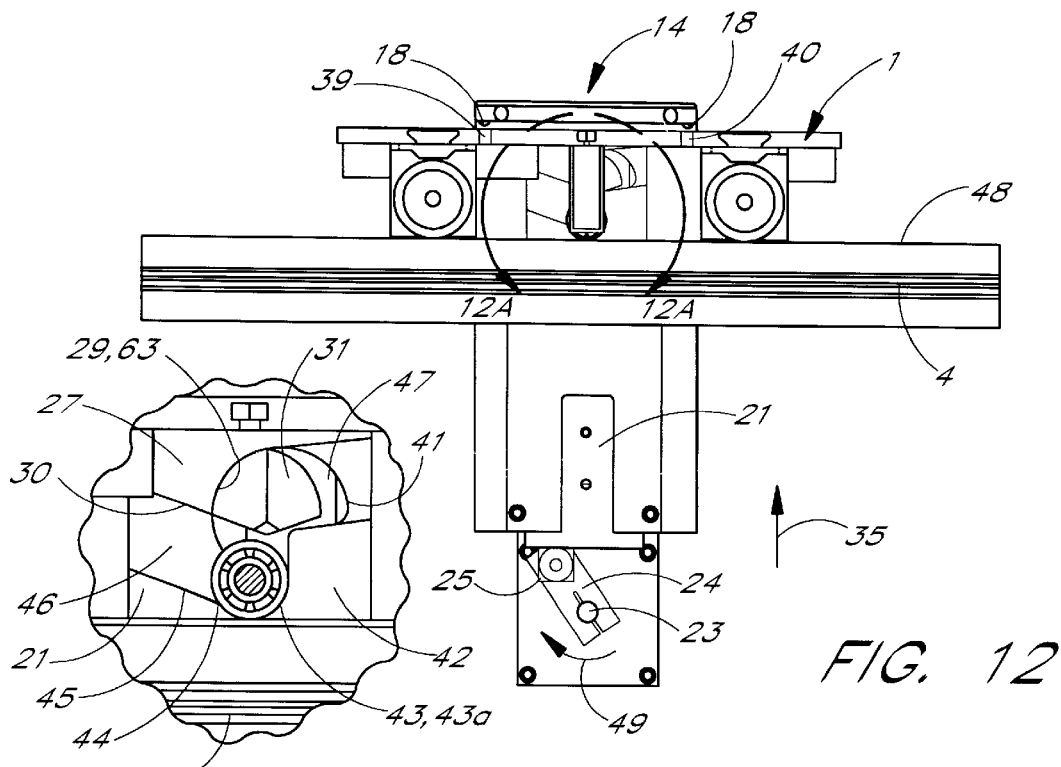
FIG. 12
FIG. 12A
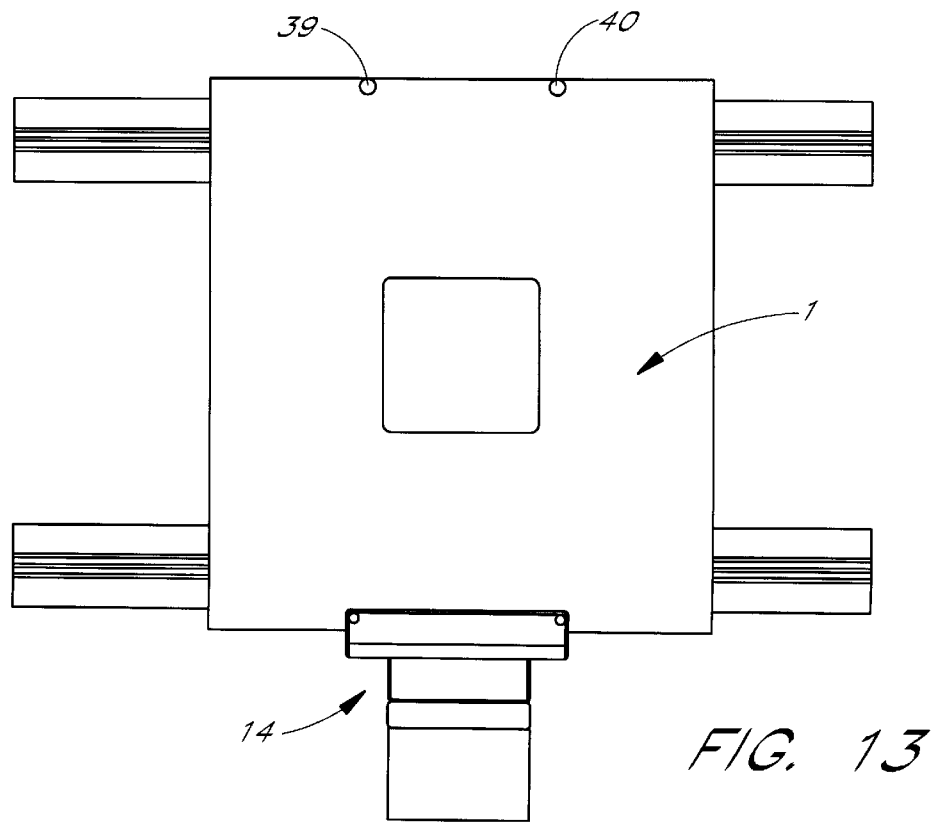
FIG. 13

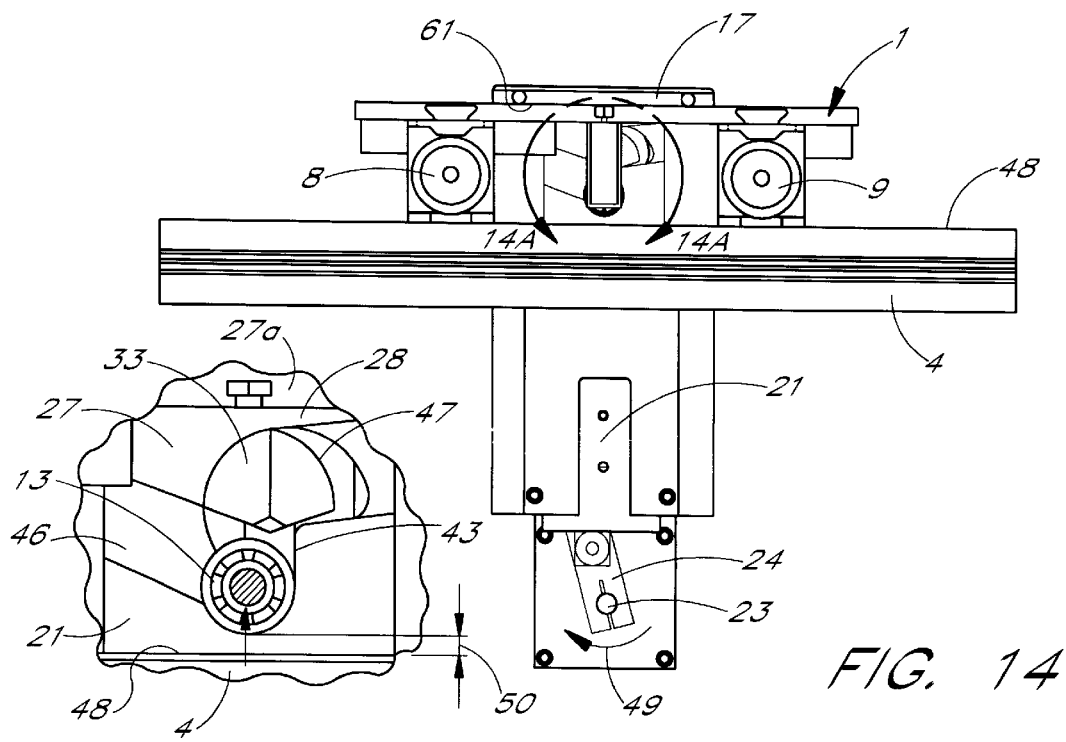
FIG. 14
FIG. 14A
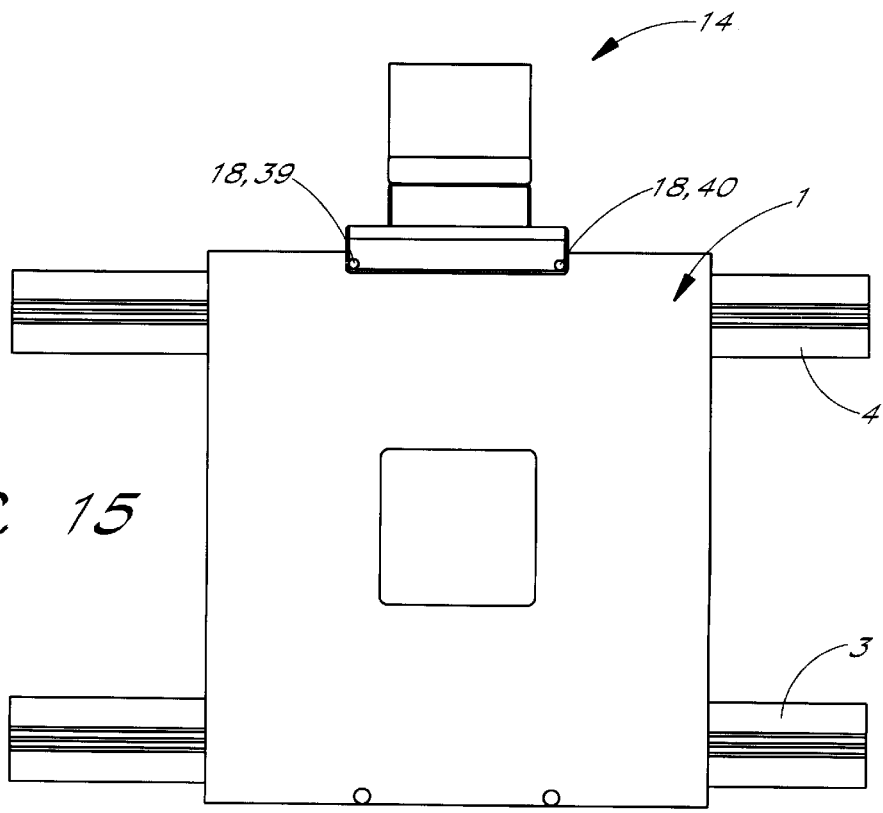
FIG. 15

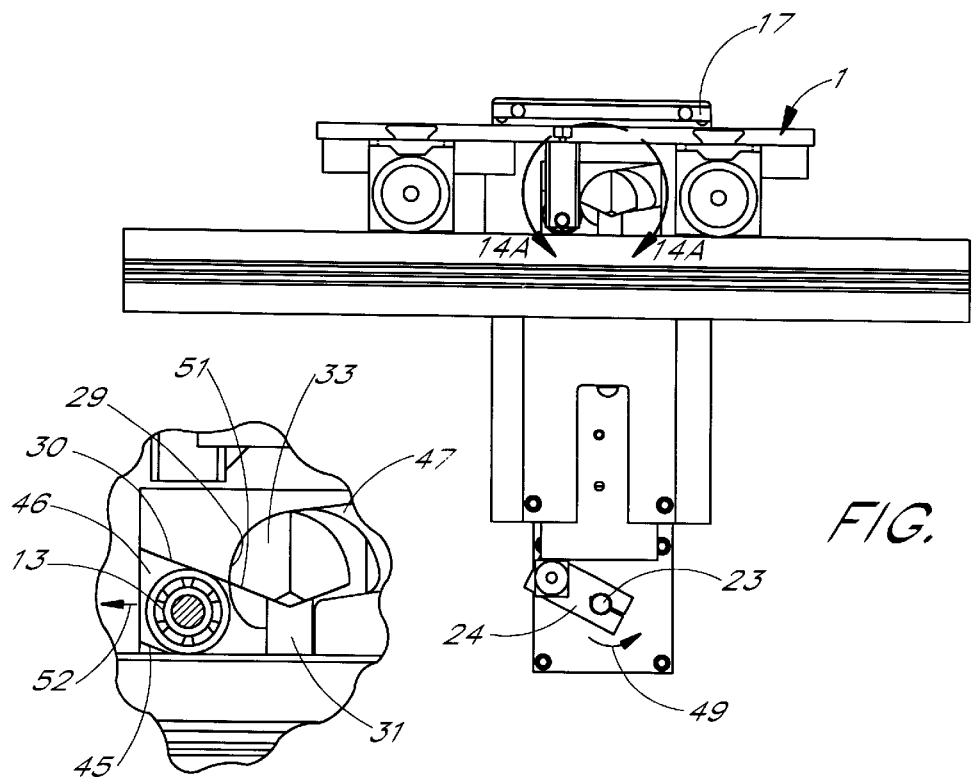
FIG. 16
FIG. 16A
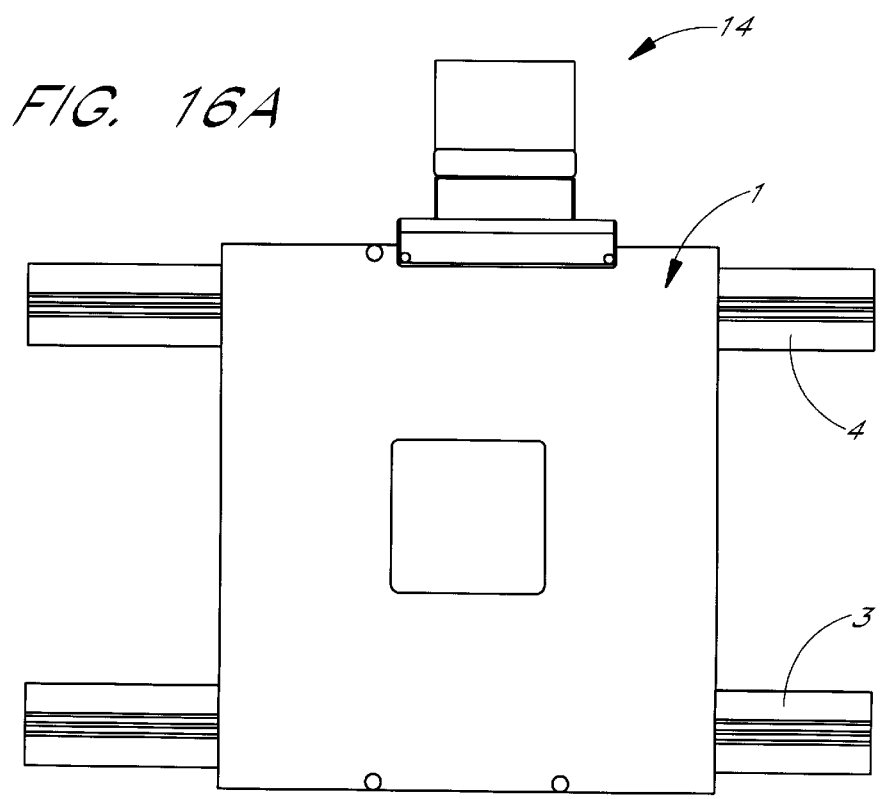
FIG. 17

METHOD AND SYSTEM FOR POSITIONING OF A CARRIER FOR WORK PIECES

FIELD OF THE INVENTION

The present invention relates to a method and device for positioning a workpiece carrier.

BACKGROUND OF THE INVENTION

With the object of DE 195 32 281, for instance, a workpiece carrier has become known which consists essentially of a base plate on which several traveling shafts are arranged, each connected immovably to a wheel, with at least one drive wheel provided that is driven by an electric motor. The known workpiece carrier can be displaced on a railway and, by means of wirelessly transferred information, it is capable of stopping at defined machining stations with the objective that defined machining processes can be performed on workpieces arranged on the base plate of the workpiece carrier.

From the cited publication, however, it is impossible to discern how the workpiece carrier in the rail system is to be positioned with high precision at a given machining station. This is important, however, for high-precision machining of workpieces fastened to the workpiece carrier. High machining precision is a requisite, particularly in machining and joining processes, with respect to the workpieces arranged on the workpiece carrier. The cited publication thus lacks a high-precision positioning of the workpiece carrier on the railway when the workpiece carrier stops at a machining station and the machining is to take place.

SUMMARY OF THE INVENTION

An aspect of the present invention involves a refined method and device for positioning a workpiece carrier in a machining station such that the workpiece carrier is positioned with high precision in the machining station.

An aspect of the present invention involves an apparatus for positioning a workpiece carrier in a machining station. The workpiece carrier is movable on a rail system and one or more machining stations are arranged along the rail system for machining a workpiece arranged on the workpiece carrier. The apparatus includes at least one positioning device arranged in an area of the machining station. The positioning device has fixtures for positioning and high-precision retention of the workpiece carrier with respect to a stationary reference surface. The positioning device further includes fixtures for decoupling the workpiece carrier from the rail system, and a deceleration and acceleration device for the workpiece carrier.

The essence of the invention is thus that the workpiece carrier is positioned, after entry into the machining station by means of at least one positioning device, with respect to a stationary reference surface, held in place with high precision and decoupled from the rail system and that, after machining of the workpiece, the workpiece carrier is released by the positioning device and can be moved further along the rail system.

With the technical teaching presented, there results the essential advantage that a high-precision positioning of the workpiece carrier in a machining station with respect to a stationary reference is achieved, with the workpiece carrier being decoupled from the rail system, so that the forces impinging from the machining and the mass forces of the workpiece carrier are absorbed exclusively by the positioning device. Thus, high-precision positioning with very good reproducibility is achieved.

This further results in the advantage that high-precision machining of workpieces arranged on the workpiece carrier is possible, because, according to a first preferred embodiment of the invention, the workpiece carrier does not remain in the rail system. The rail system may, after all, feature corresponding inaccuracies (for instance, depressions, curves, bumps or guidance imprecision) and these inaccuracies of the rail system could impair the machining precision. For this reason, the workpiece carrier is lifted off the rail system, pressed against a stationary reference of the positioning device and coupled to this reference surface by what amounts to a form fit.

With the technical teaching presented, there also exists the advantage that there is no more need to take into account an overall height that varies according to each of the different workpiece carriers because, independently of the overall height of the workpiece carrier, it is always raised sufficiently far off the rail system so that each workpiece carrier, independently of its overall height, comes to rest against a stationary upper reference surface, with respect to which the machining processes on the carrier plate of the workpiece carrier take place. Thus, different workpiece carriers of a widely varying construction can be positioned with equal precision in the positioning device, without the size and dimensions of the workpiece carrier mattering at all. There is therefore no need to take account of tolerances in the overall height of the workpiece carrier.

Neither is the positional precision of the positioning device of the invention dependent on the load weight of the workpiece carrier. That is, if the workpiece carrier remained on the rail system with different load weights and were positioned there, then there would exist the danger that the rail system might be pressed down or yield because of differing weights and thereby the machining precision could be impaired.

If, however, the workpiece carrier is lifted off the rail system according to the invention and pressed against a strong, highly loadable reference surface, then the machining of the workpiece arranged on the workpiece carrier is independent of the load weight of the workpiece carrier.

The invention is not restricted to a vertical lifting of the workpiece carrier off the rails of the rail system as above. In another configuration it is provided that the workpiece carrier remains on the rail system and that it is held tight laterally by appropriate form-fitting receptacles and couplings and thereby decoupled from the rail system in regard to active forces, so that a relieving of the rail system is achieved. In this second embodiment as well, the problem of high-precision positioning is solved with a separate positioning device. The latter-mentioned positioning device then acts essentially laterally on the workpiece carrier and fixes it in place on the rail system (without lifting it off the rail system), with the goal that different load weights of the workpiece carrier are no longer passed on to the rail system. These load weights are thus absorbed by the positioning device.

The invention is not limited either to standing workpiece carriers, i.e., workpiece carriers that roll on their running rollers on guide tracks of a rail system. The present invention pertains equally to so-called suspended systems, that is, those in which a workpiece carrier is arranged so as to move suspended on a monorail or multirail system (in the manner of the suspended train in Wuppertal).

In the embodiment of a workpiece carrier arranged so as to move suspended from the rail system as well, the two embodiments for the fixation of the workpiece carrier in the positioning device can come into consideration, namely, the raising of the entire workpiece carrier with the objective of de-suspending it from the track of the rail system and fixing it in place, on the one hand, and, on the other, the second embodiment, in which the workpiece carrier is only locked laterally to the positioning device such that corresponding load changes are no longer passed on to the rail system, but act instead on the positioning device and are absorbed by it.

In a refinement of the invention, it is preferred that a special deceleration and acceleration-device be associated with the positioning device. The aforesaid deceleration device ensures that the workpiece carrier, independently of its load weight, is always braked uniformly upon entry into the machining station. The braking behavior of this deceleration device is preferably independent of the load weight.

The aforesaid acceleration device has the task of releasing the workpiece carrier from the machining station or positioning device onto the rail system, wherein it receives a certain initial acceleration. The assignment of an initial acceleration to the workpiece carrier has the essential advantage that the electric motors arranged in the workpiece carrier do not have to tolerate any short-circuit current in accelerating from a stop to the prescribed travel velocity, but rather a certain initial motion is already assigned to the workpiece carrier by the aforesaid acceleration device and that a short-circuit current of the electric motors is therefore avoided. In this way, considerable energy for powering the electric motor or motors is saved, and the energy accumulation device arranged on the workpiece carrier can provide the workpiece carrier with a considerably longer service life.

From the acceleration device, therefore, a faster change of workpiece carriers from one workpiece carrier to the next workpiece carrier results. This turnaround time, that is, entry time into and exit time from the positioning device, influences the process rate of the entire workpiece carrier system on a rail system to a large degree overall. By using the acceleration device, it was possible for a reduction of the production rate by 10–20% to be achieved, precisely because the workpiece carriers are ejected from the positioning device at an accelerated rate.

The deceleration device for the workpiece carriers can feature various embodiments. In a preferred configuration, it is provided that this deceleration device is constructed as a slide that can be raised and lowered, accommodating, by means of a control surface, a positioning roller arranged on the workpiece carrier and converting horizontally directed travel motion into a deceleration motion.

Instead of such a mechanical deceleration device, however, other deceleration devices can also find application. A deceleration device of this type could, for instance, consist of a deceleration element which hydraulically or pneumatically counters the travel motion of the workpiece carrier, thus absorbing it and likewise braking it to zero velocity. In place of such a hydraulic or mechanical damping, an electromagnetic braking by means of an electromagnet can also be provided.

The same applies to the acceleration device to be described later. In a preferred configuration, a mechanical acceleration device which cooperates with the previously mentioned mechanical slide is preferred. Instead of such a mechanical acceleration device, however, hydraulic, pneumatic or electromagnetic acceleration devices may also find application. The same applies here as was previously said for the deceleration device, namely, that a hydraulically or pneumatically actuated acceleration cylinder can be used, it being preferred if the cylinder previously used for the deceleration motion is subsequently used for the provision of an acceleration motion.

In a third configuration, it can be provided that the workpiece carrier runs up against a free-blowing stream from a jet stream, the nozzle of which is controlled such that here, too, a gentle braking from the travel velocity to a standstill takes place and, further, this nozzle can also be used for the subsequent acceleration of the workpiece carrier out of the positioning device, the nozzle then blowing onto the workpiece carrier and accelerating it.

In another configuration, a mechanical energy accumulator can be used as an acceleration and deceleration device, first absorbing and storing the kinetic energy from the workpiece carrier as an energy accumulator. After completion of machining in the positioning device, this energy stored in the energy accumulator can be released and imparted to the workpiece carrier, which is then accelerated out onto the rail system by drawing upon this energy.

BRIEF DESCRIPTION OF THE DRAWINGS

The invention will be described in greater detail below on the basis of drawings illustrating several embodiment paths. In this regard, additional essential features of advantages of the invention can be discerned from the drawings. Shown are:

FIG. 2, the positioning device from FIG. 1 in a front view;

FIG. 3, the positioning device in section along the line A—A in FIG. 2;

FIG. 4, plan view of the positioning device from FIG. 2;

FIG. 5, side view of the positioning device from FIG. 2;

FIG. 5a, a section through the lever head, schematically;

FIG. 10, the position of the workpiece carrier relative to the positioning device in the "deceleration" position.

FIG. 10a, enlarged representation of the engagement of the positioning roller of the workpiece carrier in the positioning device;

FIG. 11, plan view onto the arrangement from FIG. 10;

FIG. 12, the position of the workpiece carrier relative to the positioning device in the "pre-positioning" position.

FIG. 12a, enlarged representation of the engagement of the positioning roller of the workpiece carrier in the positioning device;

FIG. 13, plan view onto the arrangement from FIG. 12;

FIG. 14, the position of the workpiece carrier relative to the positioning device in the "machining" position.

FIG. 14a, enlarged representation of the position of the positioning roller [relative] to the positioning device;

FIG. 15, plan view onto the arrangement from FIG. 14;

FIG. 16, the position of the workpiece carrier relative to the positioning device in the "acceleration" position.

FIG. 16a, the position of the positioning roller relative to the positioning device.

FIG. 17, plan view onto the arrangement from FIG. 16;

DETAILED DESCRIPTION OF THE INVENTION

Figure 1:
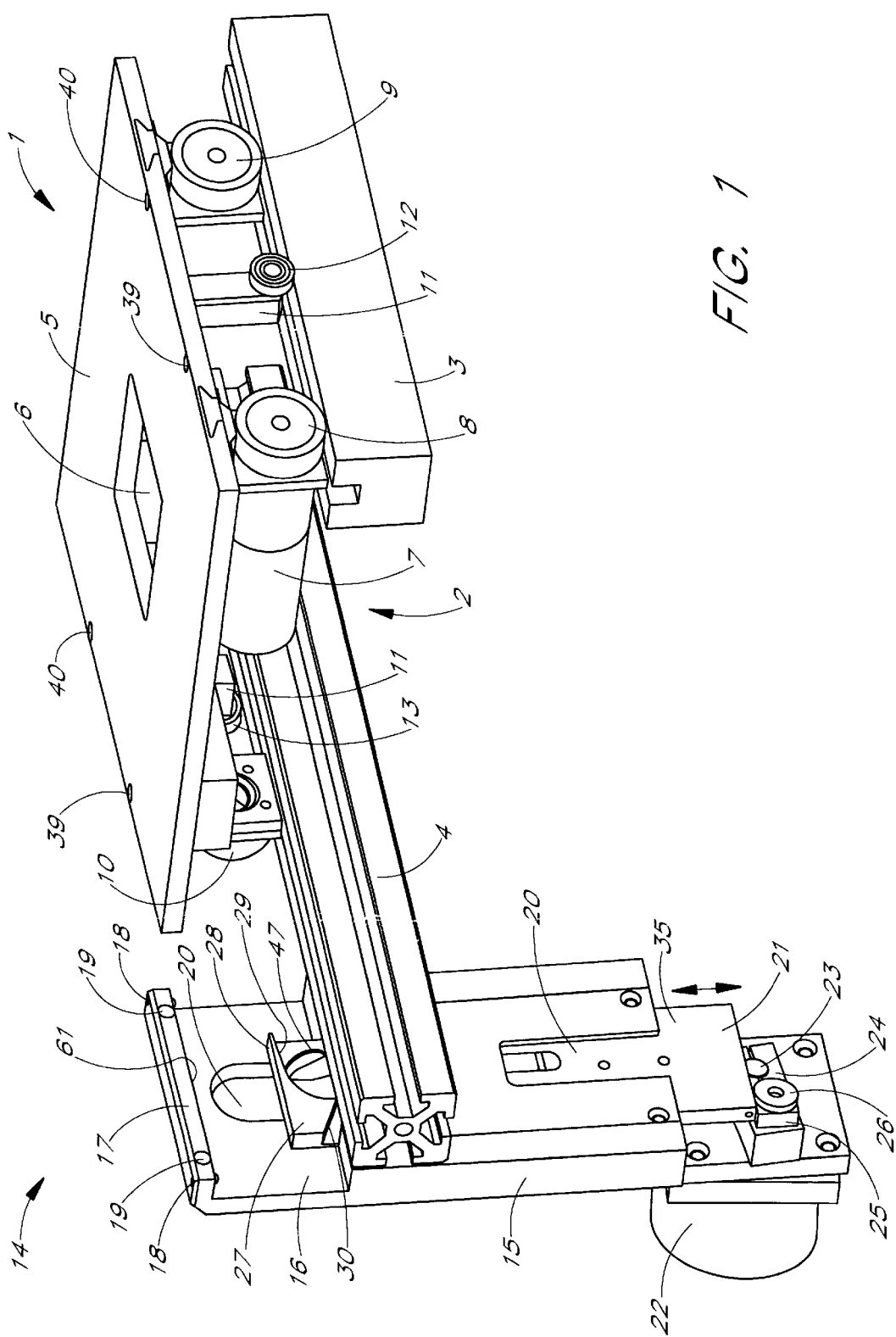
FIG. 1, schematized, a partial view of a rail system with a workpiece carrier running on it, before reaching a positioning device.
Figure 6:
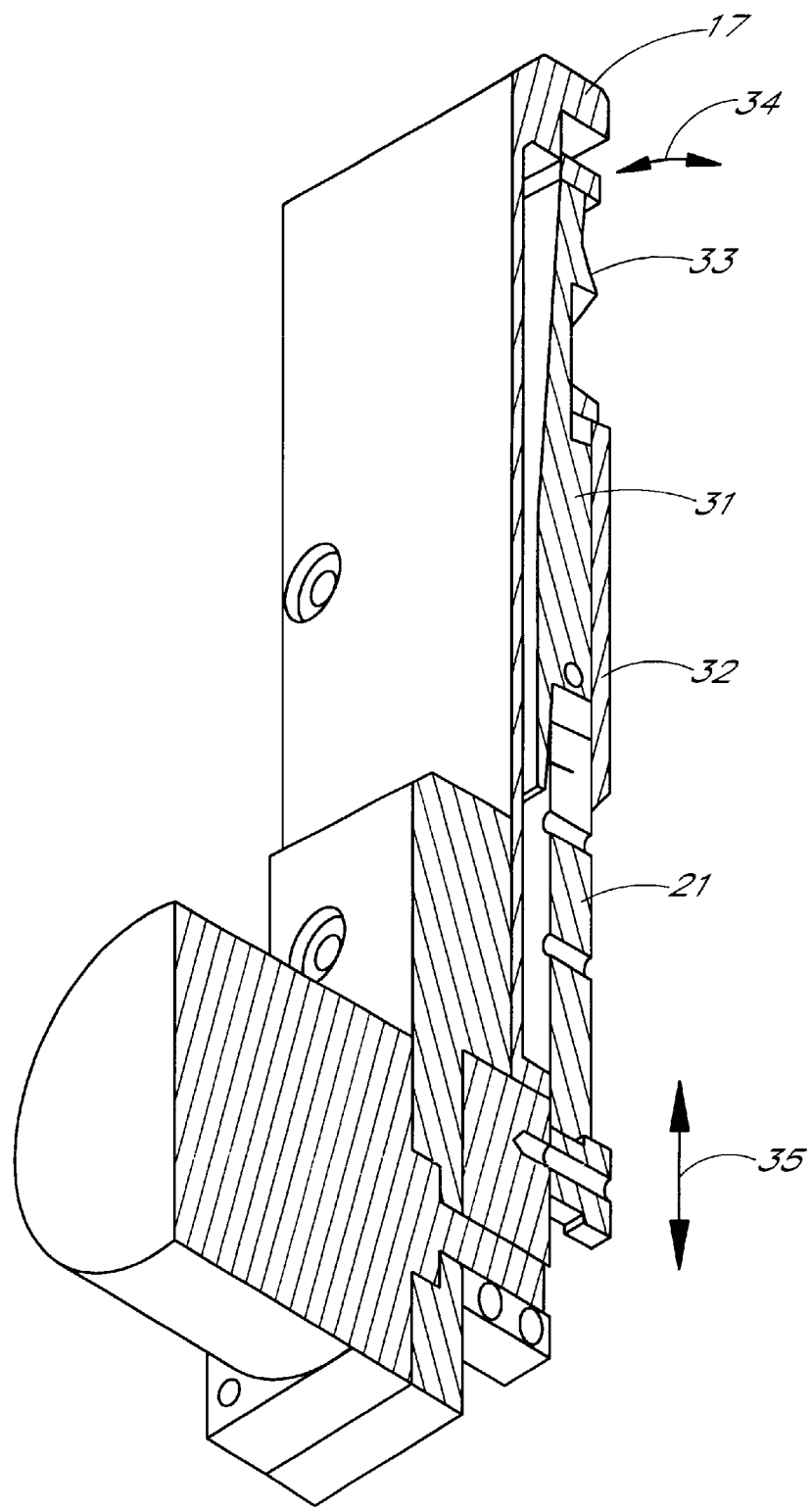
FIG. 6, prospectively, the positioning device from FIG. 2 in section.
Figure 7:
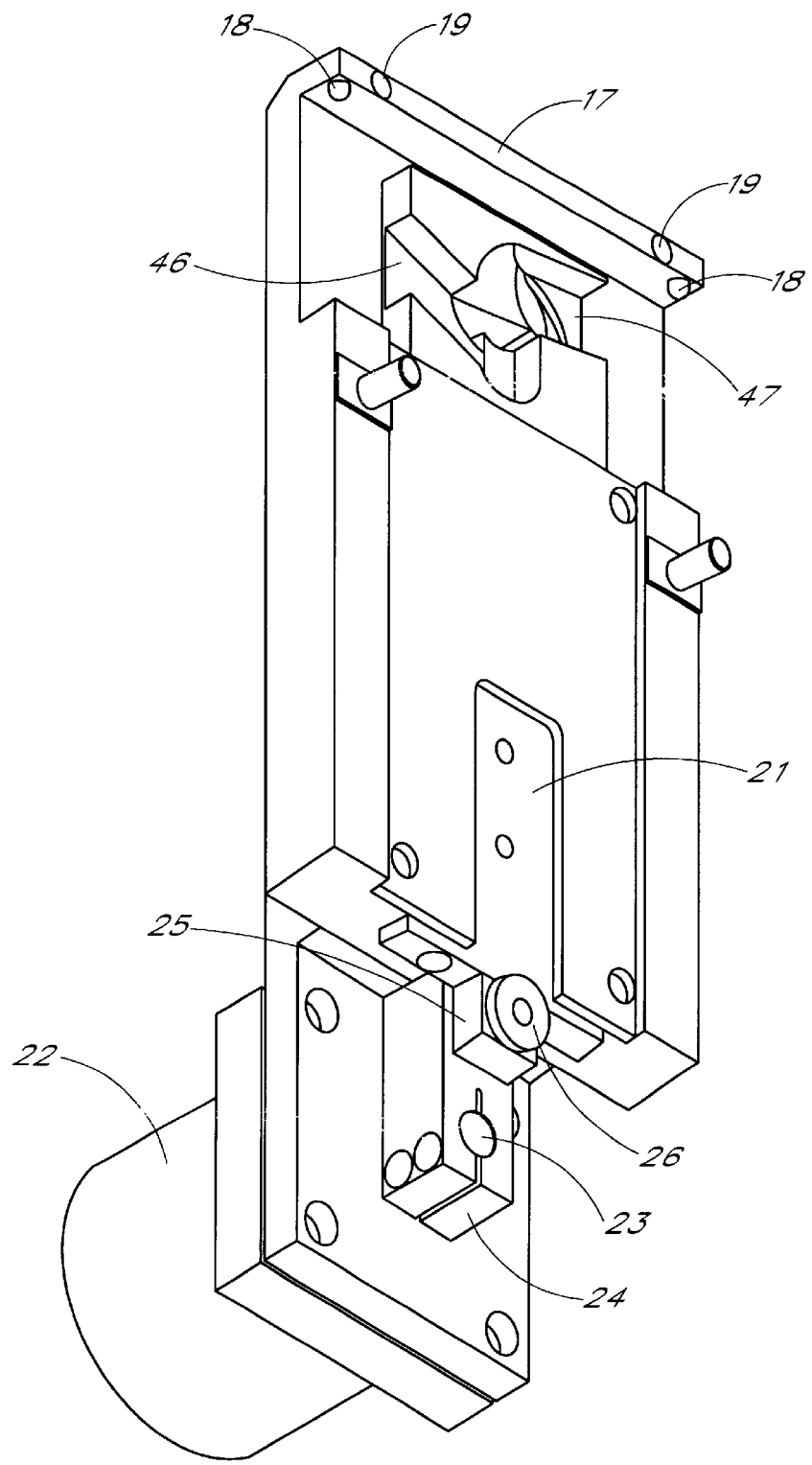
FIG. 7, perspective side view of the positioning device from FIG. 2.

For the sake of example, a railway with a two-rail system 2 is shown in FIG. 1, having an inner rail 3 and an outer rail 4. The invention is not restricted to this, however. It suffices to provide merely a single rail, for instance, the outer rail 4, or three or more rails could be provided. It is likewise not necessary to arrange the workpiece carrier 1 upright on the rail system 2. It can also be arranged suspended.

In the embodiment shown, the workpiece carrier 1 consists essentially of an upper carrier plate 5 having a central cutout 6, through which appropriate machining processes can take place; that is to say, as soon as the workpiece carrier 1 is precisely positioned in the positioning device 14, associated machine tools access the workpiece carrier 1 from above and below, and can machine, in the appropriate manner, workpieces, fastened to the workpiece carrier 1 not shown in detail here. At least one drive motor 7 is arranged on the bottom of the carrier plate 5 and is connected, without rotational play, to a drive wheel 8 which rolls on an associated running surface of the inner rail 3 and thus propels the workpiece carrier 1. One or more passive wheels 9, 10, which likewise roll along on the associated running surfaces of the rail system 2, may also be provided.

In order to position the workpiece carrier 1 in the area of a positioning device 14 arranged stationary in a machining station, a mounting block 11, on which a positioning roller 12, 13 is arranged free to rotate, is arranged on the sides of the carrier plate 5. The invention is not limited to a suspended arrangement of the mounting blocks 11 on the bottom of the carrier plate 5. It can equally well be provided for the mounting block 11 to be arranged upright on the carrier plate 5, the positioning rollers 12, 13 correspondingly arranged on top, above the carrier plate 5.

It is likewise not necessary for a positioning device 14 to be arranged on each side of the rail system. In FIG. 1, only the positioning device 14 on the outer side of the outer rail 4 is shown. Two positioning devices 14, however, facing one another and arranged on the inner and the outer rail, can also be present.

It is not shown that the positioning roller 12 located on the inner rail 3 cooperates with an identical additional positioning device 14 arranged mirror-symmetrically with respect to the positioning device 14 alongside the inner rail 3.

It is likewise not essential that the one or more positioning devices 14 act on the workpiece carrier 1 and are capable of being coupled to it laterally. It could also be provided for the positioning devices to be arranged between the rails 3, 4 and to couple, respectively, the front and rear sides of the workpiece carrier 1, as viewed in the travel direction. For this case, it must be provided, however, that the positioning devices 14 are arranged so as to be able to be raised from and lowered to the rail system, in order to permit an unimpeded travel operation of the workpiece carrier 1 outside the positioning devices 14.

The positioning device consists, in essence, of a stationary bearing plate 15, on which a stationary reference surface 61 is arranged. The stationary reference surface 61, to which the carrier plate 5 of the workpiece carrier 1 is coupled, is formed as a right-angle bend 17 which is placed in one piece on a bearing plate 14 of the positioning device 14. I the area of this right-angle bend 17, stationary positioning pins 18 are arranged, which can be coupled to associated holes 39, 40 in the edge area of the carrier plate 5 and engage in these holes 39, 40 with a form fit. In this regard, it is not necessary that these positioning pins 18 are formed round in order to interact with the holes 39, 40, which are likewise round. In a different configuration, the positioning pins 18 can be formed in a profiled shape in order to interact with likewise profiled holes 39, 40 in the carrier plate 5 of the workpiece carrier 1 so as to permit a form-fit coupling of the carrier plate 5 with as little play as possible in the area of this right-angle bend 17 of the bearing plate 15 of the positioning device 14.

In the engagement of the positioning pins 18 in the associated holes 39, 40 in the carrier plate 5 of the positioning device 1, damping elements 19 also come into play, which project beyond the lower reference surface 61 of the right-angle bend 17 and guarantee a soft contact of the carrier plate 5 when carrier plate is raised.

Furthermore, a slide 21 capable of movement is housed in a cutout 20 of the bearing plate 15, and comprises a slide head 27 which comes into contact during the positioning of the workpiece carrier 1 with its carrier plate 5, lifts the latter and presses it against the reference surface 61 so that the positioning pins 18 engage with the associated positioning holes 39, 40 of carrier plate 5.

The lifting and lowering power of the slide 21 is accomplished essentially by a cylinder 22 having a rotating piston rod 23 coupled tightly to an eccentric lever 24. At the eccentric end of this eccentric lever 24, a sliding block 25 is seated in a bolt, with a roller or disc 26 solidly connected to this bolt arranged at its front end. By the appropriate rotation of the eccentric lever 24, the sliding block 25 rolls, according to FIG. 1, along the bottom side of the slide 21, which correspondingly rises and falls in the directions of arrows 35.

The upper end of the slide 21 is constructed as a slide head 27, which has a channel 47 open opposite the travel direction of the workpiece carrier 1, the upper channel wall of which is formed by a control surface 29 with a narrow end face 28 which extends over the respective entering positioning roller 13. The positioning roller 13 thus moves underneath the end face 28 onto the control surface 29 that is formed in slide head 27. The control surface 29 constitutes the deceleration path of the positioning roller 13 of the workpiece carrier 1 entering the positioning device 14.

The slide head 27 also features a channel 46 which opens in the travel direction 36 of the workpiece carrier 1 and is formed underneath and offset from the first channel 47. Channel 46 has a slanted control surface (51, 30), along which the positioning roller 13 of the workpiece carrier rolls during the lowering of the side 21 and brings about an acceleration of the workpiece carrier 1.

The slide head thus consists, in essence, of two parts, namely, a part 42 in which the deceleration path is arranged in the form of channel 47, and an additional part in which the channel 46 associated with acceleration is arranged.

Interacting with the vertically movable slide 21 is a lever 31 (FIG. 2) that is constructed so as to be able to pivot in a plane perpendicular to the displacement direction of the slide 21. The function of the slide 21 and the lever 31 is described in greater detail below. The pivoting motion of the lever 31 is controlled by the positioning roller. In turn, the lever 31 controls the transition of the positioning roller 13 from the channel 47 to the channel 46, as will be described extensively below.

The deceleration and acceleration device described further below, formed in essence by the slide 21, is arranged in the area of a cutout 16 of the positioning device 14.

The additional construction of the positioning device 14 is described on the basis of FIGS. 2–7. It is evident that a rotary shaft 32, on which the lever 31 can be pivoted in the directions of arrows 34, is arranged in the slide 21. The lever 31 features a lever head 33 that has a roughly roof-shaped cross section (FIG. 5a) and engages in the channel 47 of the slide head 27 and can be moved out of the latter. In the rest position, therefore, the lever 31 engages with its lever head 33 in the channel 47 of the slide head 27 and is retained there by the force of a spring 63.

As soon as the positioning roller 13 enters the channel 47 of the slide head 27, the roller 13 thus runs up onto the roof-shaped lever head 33, which is thereby pivoted against the force of the spring 63 backwards in the direction of arrow 34 (counterclockwise) and thus releases the channel 47. The lever thus pivots into the cutout 20 of the bearing plate 15 according to FIG. 3.

Based on FIGS. 8–17, the steps occurring in temporal succession during the entry, positioning and exit of the workpiece carrier 1 from the positioning device 14 will be explained in greater detail.

Figure 8:
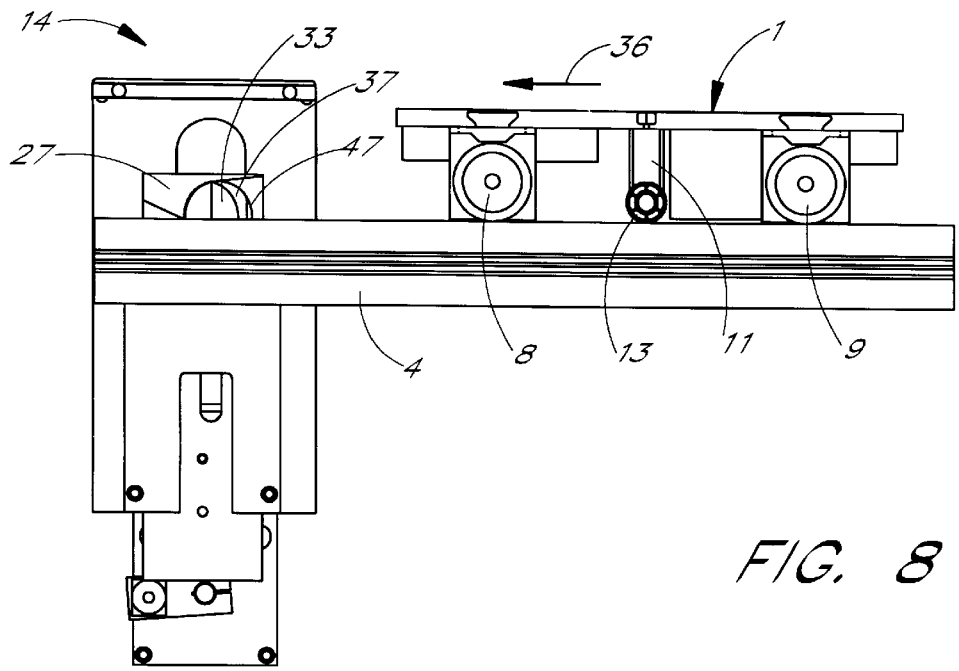
FIG. 8, the position of the workpiece carrier in front of the positioning device in the "enter" position.
Figure 9:
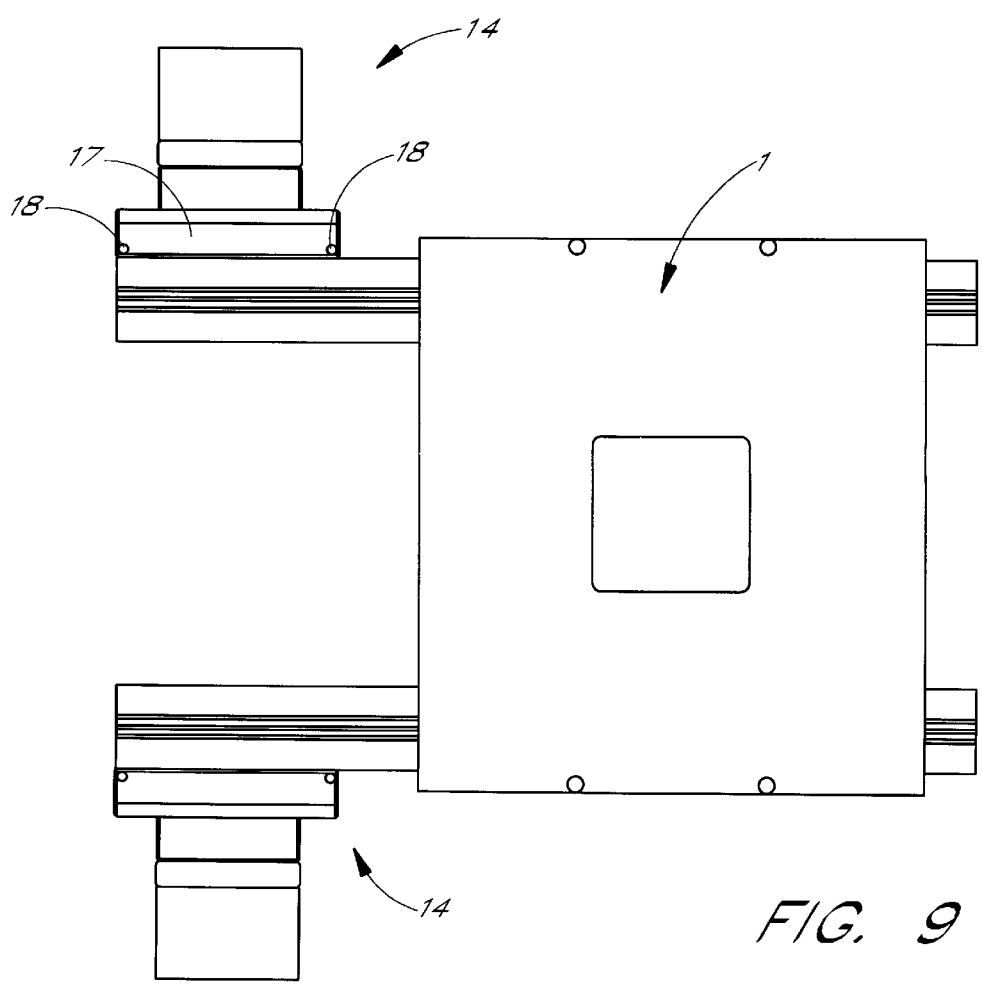
FIG. 9, plan view onto the arrangement from FIG. 8.

FIGS. 8 and 9 show the workpiece carrier 1 in a position far from the positioning device 14. It is recognizable here that the slide 27 has been lowered downward and that simultaneously the lever head 33 fills out the channel 47. The workpiece carrier 1 is moving here in the travel direction (direction of arrow 36) toward the positioning device 14.

In FIGS. 10 and 11, the "deceleration" position of the workpiece carrier 1 in the positioning device 14 is described in greater detail. FIG. 10 and, in particular, FIG. 10a show that the workpiece carrier has reached the area of the positioning device, the positioning roller 13 now entering into the channel 47 on the slide head 27 and moving along the lower side of the control surface 29. This control surface 29 narrows downward in the direction of travel 36 in roughly an arc shape, so that the slide 21 is raised by further entry of the positioning roller of the positioning roller 13 into the curve 64 of the control surface 29, the raising taking place under spring tension against the force of a spring, not shown in greater detail, which is arranged with one end on the slide 21 and the other on the bearing plate 15. The lower end of the slide 21 can thus lift off the bearing block 25.

In another embodiment, not shown in greater detail, it can be provided that the previously mentioned sliding block 25 is directly coupled to the slide, and thus the slide cannot be detached from the sliding block and the raising motion exerted on the slide 21 is absorbed by the sliding bock 25 and converted into a corresponding rotary motion onto the piston rod 23, which in turn interacts with the cylinder 22. The cylinder 22 is thus constructed as a deceleration cylinder and correspondingly damps the lifting motion of the slide 21.

Moreover, FIG. 10a shows that the previously mentioned lever 31 engages with its lever head 33 in the channel 47 and that accordingly (see the later drawings), with further movement of the positioning roller 13 into the channel 47, the lever head 33 is pivoted back (perpendicular to the drawing plane of FIG. 10a) against the force of the spring 63 such that, at the termination of the deceleration movement, the positioning roller 13 makes an approximate form fit against the slide head 27 at the arch 64 of the control surface 29, the lever head 33 is located outside the channel 47 behind the positioning roller 13, and the slide head has been raised by a certain amount in the direction of arrow 35. In the end position illustrated, therefore, the workpiece carrier 1 has been braked to a stop upon contact of the positioning roller 13 with the arch 64, and is now lying against the arch 64 in the proper position.

FIG. 11 shows that, in this position, the positioning pins 18 have not yet engaged with the holes 39,40 on the carrier plate 5.

Once the positioning roller 13 has completed its movement into the channel 47, the cylinder 22 is triggered, according to FIGS. 12, 12a and 13, and the piston rod 23 carries out a rotary motion in the direction of arrow 49, whereby the eccentric lever 24 is turned clockwise and the sliding block 25 rolls along on the bottom side of the slide 21 and lifts the slide 21 up in the direction of arrow 35.

This has the effect that the positioning roller 13 comes out of engagement with the arch 64 (FIG. 12a) and slides in the process along an additional downward guide surface 43 adjoining the arch 64 that transforms into an arch 43a which is roughly the opposite of the previously mentioned arch 64. There is thus a transition of the positioning roller from the incoming channel 47 to the outgoing channel 46 along the guide surface 43. The lower surface of the incoming channel (deceleration channel 47) is formed by a pre-positioning surface 41 which initially runs roughly parallel to the previously mentioned control surface 29 and then, according to FIG. 12a, transforms into the guide surface 43. Roughly at position 44 (see FIG. 12a), the arch 43a transforms into an incline 45 directed upward, which forms the lower edge of the channel 46 serving for acceleration.

The positioning roller 13 is now oriented in proper position at the right-angle bend 17. The positioning pins 18 are thus arranged in the proper opposing position to the holes 39, 40 of the carrier plate 5, but have not yet engaged in the carrier plate 5.

This engagement takes place in the next process according to FIGS. 14, 14a and 15. Upon further turning of the piston rod 23 in the direction of arrow 49, the slide is raised further upwards in the direction of arrow 35, the slide head 27 contacting, at an upper surface 27a, the bottom of the carrier plate 5 and lifting it. The lifting takes place during the further revolution of the eccentric lever 24 in the direction of arrow 49 until the previously mentioned positioning pins 18 engage in a form fit, practically without any play, in the associated holes 39,40 of the carrier plate 5 of the workpiece carrier 1, and position it properly and hold it in place without play. It is recognizable in FIG. 14a that the positioning roller 13 has been lifted up by the distance 50 and that, accordingly, the wheels 8, 9 of the workpiece carrier 1 have been lifted off the running surface 48 of the rail system 3,4. The reference surface 61 on the underside of the right-angle bend 17 is thus a highly precise contact surface for the workpiece carrier 1, which is held play-free at this surface.

In the position of FIGS. 14 and 15 the actual high-precision machining of workpieces on the workpiece carrier 1 held in place in the positioning device 14 now takes place. After machining of such workpieces is finished, the workpiece carrier 1 can leave the positioning device 14, being accelerated while leaving.

As shown in FIGS. 16–17, an acceleration of the workpiece carrier 1 in the direction of arrow 52 takes place due to the lowering of the slide 21 in the direction of arrow 35.

It is recognizable here that, in the transition from FIG. 14a to FIG. 16a, the workpiece carrier was first lowered so that the running wheels 8, 9 again lie on the running surface 48 of the rail system 3,4. In this position the positioning roller 13 has a location as per FIG. 14a. Thus the positioning pins 18 also come out of engagement with the holes 39, 40 of the carrier plate 5.

Now the eccentric lever 24 is driven rotationally in the opposite direction, namely, the direction of arrow 49', whereby the slide 21 is further lowered. Since the positioning roller 13 is now located outside the entry channel 47, the lever 31 has returned to its rest position due to the force of spring 63, the lever head again coming to rest in channel 47. Thereby the positioning roller 13 is prevented during further lowering of the slide 21 from slipping back into the channel 47, but instead collides against a control surface 51 of the lever head 33. The positioning roller 13 is now displaced outward over the control surface 51, which is inclined outward and widens towards the front, the roller making contact only with this control surface 51, since the wheels 9, 10 are already situated on top of the running surface 48 of the rail system 3, 4 and take on a corresponding support load. Upon further lowering of the slide 21, the positioning roller 13 is displaced further outward in the direction of arrow 52 and now moves on to a control surface 30 which is represented by the upper edge of channel 46. The control surface 51 makes a smooth transition into the control surface 30. Because the control surfaces 51, 30 open conically outwards, an acceleration effect is exerted on the positioning roller 13, so that the workpiece carrier is thereby accelerated in the direction of arrow 52 on the rail system 3, 4 and receives a certain initial velocity when it leaves the positioning device 14.

Thus there exists the advantage that the drive motor 7 need not accelerate the drive wheel 8 from a standing start; rather, the drive wheel 8 is already turning at a certain minimum velocity, so that the drive motor 7 avoids a short-circuit operation and can provide a certain initial current which is lower than the short-circuit current which would have to be provided if the drive wheel 8 had to be accelerated out of a standing start to the necessary running velocity. Thereby, considerable propulsion energy is saved, and the energy storage units of the workpiece carrier 1 that supply the drive motor 7 can supply the drive motor 7 for a longer time.

FIG. 17 shows that the workpiece carrier 1 has now traveled out of the positioning device 14 in the direction of arrow 52.

Figure 18:
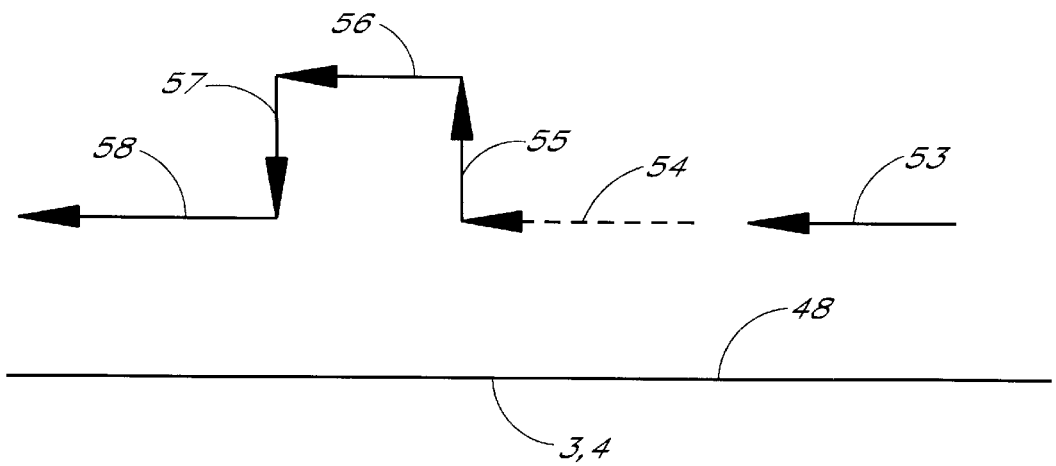
FIG. 18, schematized, the motion sequences in the positioning of the workpiece carrier in the positioning device according to FIGS. 1–17.

Based on FIG. 18, the motion sequence described above will be schematically explained. First, there is travel 53 of the workpiece carrier 1 on the rail system 3, 4. With 54 a deceleration of the workpiece carrier 1 during entry into the positioning device 14 takes place. It is then lifted at 55 and held in place in the positioning device 14. In this position, a high-precision positioning of the workpiece carrier 1 in the positioning device 14 thus takes place, because it is fixed in the proper place and with high precision. The position 56 symbolizes the machining of workpieces on the workpiece carrier without the latter being displaced longitudinally on the rail system. After termination of the machining process, the lowering 57 of the workpiece carrier onto the rail system takes place and it then leaves the positioning device 14 with a certain minimum velocity 58.

Figure 19:
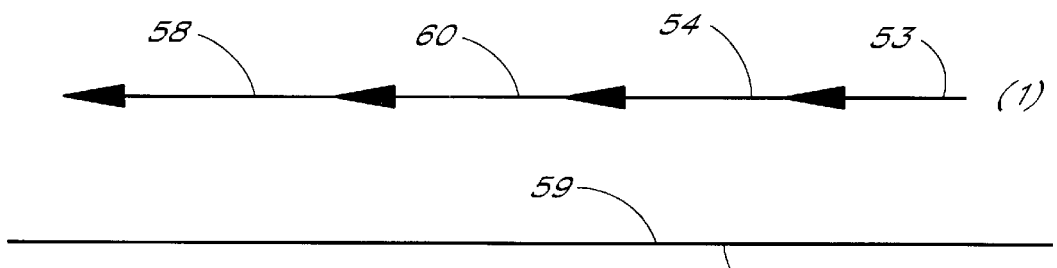
FIG. 19, a motion sequence modified with respect to FIG. 18 of a workpiece carrier not lifted from the rail system.

FIG. 19 shows an embodiment of a possible motion sequence which is varied with respect to FIG. 18, from which it can be concluded that it is not necessary to lift the workpiece carrier out of the rail system. FIG. 19 shows that a lateral coupling of the workpiece carrier in the rail system can also take place, wherein it remains in the rail system but is decoupled from the rail system. Here it is shown schematically that lateral running surfaces 59 of the rail system are present and that, from the travel motion 53, is decelerated at 54 and then held in place laterally 60 in the positioning device 14. Therewith a decoupling of the workpiece carrier 1 from the rail system has taken place, so that any load impacts, machining strokes and the like are kept away from the rail system. After appropriate decoupling at position 60, the workpiece carrier is again led to the travel operation at 58, wherein, according to the description above, it can again achieve a certain minimum starting velocity from the previously described acceleration path.

The slide 21 of the above-described positioning device need not be constructed so as to be capable of raising and lowering vertically, but instead, the slide 21 may constructed so as to be capable of movement in the horizontal plane as well, with all the previously described characteristics, and of moving laterally toward and away from the workpiece carrier 1. The only difference is then that the positioning pins 18 are arranged on the slide and can be coupled to the carrier plate 5 of the workpiece carrier 1 in the correct position and with high precision.

For the realization of the concept of the invention, however, it is not absolutely necessary to construct, alongside the deceleration path with channel 47, a corresponding acceleration channel 46. It can also be provided for the channel 46 to be omitted and the workpiece carrier 1 to be simply put back on the rail system 3, 4 and accelerated by the drive motor 7 from a standstill back up to the necessary travel velocity.

For this case, it is no longer necessary to provide the lever 31 with its lever head 33, whose only function is to prevent the positioning roller 13 lying in channel 46 from being displaced back into channel 47 after the transition of the positioning roller 13 from channel 47 into channel 46. The lever thus closes off this channel 46 on top with its head 33, so that the positioning roller 13 is forced to pass through channel 46 and be correspondingly accelerated in the travel direction 52.

| Legend to the drawings | |
|---|---|
| 1 | Workpiece carrier |
| 2 | Rail system |
| 3 | Inner rail |
| 4 | Outer rail |
| 5 | Carrier plate |
| 6 | Cutout |
| 7 | Drive motor |
| 8 | Drive wheel |
| 9 | Wheel |
| 10 | Wheel |
| 11 | Retainer block |
| 12 | Positioning roller |
| 13 | Positioning roller |
| 14 | Positioning device |
| 15 | Bearing plate |
| 16 | Cutout |
| 17 | Right-angle bend |
| 18 | Positioning pins |
| 19 | Damping element |
| 20 | Cutout |
| 21 | Slide |
| 22 | Cylinder |
| 23 | Piston rod |

-continued

Legend to the drawings

| | |
|---|---|
| 24 | Eccentric lever |
| 25 | Sliding block |
| 26 | Roller |
| 27 | Slide head |
| 27a | Surface |
| 28 | End face |
| 29 | Control surface (braking) |
| 30 | Control surface (acceleration) |
| 31 | Lever |
| 32 | Fulcrum |
| 33 | Lever head |
| 34 | Direction of arrow (lever 31) |
| 35 | Direction of arrow (slide 21) |
| 36 | Direction of arrow |
| 37 | Release |
| 38 | Blending line |
| 39 | Hole |
| 40 | Hole |
| 41 | Prepositioning surface |
| 42 | Part (slide head 27) |
| 43 | Guide surface |
| 43a | Arch |
| 44 | Position |
| 45 | Incline |
| 46 | Channel (slide head 27) |
| 47 | Channel (slide head 27) |
| 48 | Running surface |
| 49 | Direction of arrow, 49' |
| 50 | Distance |
| 51 | Control surface (lever 31) |
| 52 | Arrow direction |
| 53 | Travel |
| 54 | Deceleration |
| 55 | Raising and fixation |
| 56 | Machining |
| 57 | Lowering |
| 58 | Travel |
| 59 | Lateral running surface |
| 60 | Fixation |
| 61 | Reference surface |
| 62 | End |
| 63 | Spring |
| 64 | Arch |

What is claimed is:

1. A method for positioning a workpiece carrier in a machining station, wherein the workpiece carrier is movable on a rail system and a machining of a workpiece arranged on the workpiece carrier takes place in at least one machining station arranged along the rail system, comprising:

individually operating a workpiece carrier within the rail system, wherein the workpiece carrier is self-driven by a drive motor mounted on the workpiece carrier;

introducing the workpiece carrier to a machining station;

decelerating the workpiece carrier with a deceleration device while introducing the workpiece carrier to a positioning device;

positioning the workpiece carrier relative to a stationary reference surface using the positioning device;

uncoupling the workpiece carrier from the rail system within the machining station;

precisely holding the workpiece carrier in place while being decoupled from the rail system;

machining the workpiece;

releasing the workpiece carrier from the positioning device;

accelerating the workpiece carrier to a predetermined initial velocity using an acceleration device while leaving the positioning device; and moving the workpiece carrier along the rail system.

2. The method of claim 1, further comprising lifting the workpiece carrier off the rail system, positioning and precisely holding the workpiece carrier in place with respect to the stationary reference surface using the positioning device, and placing the workpiece carrier back onto the rail system after machining.

3. The method of claim 1, further comprising laterally gripping the workpiece carrier, positioning and precisely holding the workpiece carrier in place with respect to the stationary reference surface using the positioning device.

4. The method of claim 1, wherein the workpiece carrier is movable on the rail system.

5. The method of claim 1, wherein the workpiece carrier is movable along the rail system while suspended.

6. An apparatus for positioning a workpiece carrier in a machining station, wherein the workpiece carrier is self-driven by a drive motor mounted on the workpiece carrier and individually movable on a rail system and wherein one or more machining stations are arranged along the rail system for machining a workpiece arranged on the workpiece carrier, comprising at least one positioning device arranged in an area of the machining station, wherein the positioning device has fixtures for positioning and high-precision retention of the workpiece carrier with respect to a stationary reference surface, and fixtures for decoupling the workpiece carrier from the rail system while within the machining station, and wherein the positioning device further comprises a deceleration and acceleration device, the deceleration device configured to decelerate the workpiece carrier while introducing the workpiece carrier to the positioning device, and the acceleration device configured to accelerate the workpiece carrier to an initial velocity while leaving the positioning device.

7. The apparatus of claim 6, wherein the workpiece carrier includes a carrier plate, on which one or more wheels are arranged and on which at least one positioning roller is arranged that interacts with the fixtures of the stationary positioning device.

8. The apparatus of claim 6, wherein the positioning device comprises a bearing plate including the stationary reference surface, wherein at least one positioning pin is arranged on the reference surface, wherein a slider is provided which is movable arranged within the bearing plate and comprises a slider head, wherein the slider head rests against the carrier plate on the workpiece carrier, lifts the bearing plate from the rail system, and presses against the reference surface such that the positioning pin engages in associated positioning holes of the carrier plate.

9. The apparatus of claim 8, wherein the slider is driven by a hydraulic piston/cylinder unit.

10. The apparatus of claim 8, wherein within the bearing plate of the positioning device, a spring-loaded lever is arranged that is pivotable about a rotational axis, and wherein a lever head is provided that cooperates with the positioning roller to actuate the lever.

11. The apparatus of claim 6, wherein the deceleration and acceleration device includes a mechanical energy accumulator which, during a braking of the workpiece carrier, stores kinetic energy of the workpiece carrier and again releases the kinetic energy during an acceleration.

12. The apparatus of claim 10, wherein the deceleration and acceleration device is constructed as part of the slider configured to be raised and lowered, wherein the slider head accommodates the positioning roller arranged on the workpiece carrier through a control surface and converses a horizontally-acting travel motion of the workpiece carrier into a deceleration motion.

13. The apparatus of claim 12, wherein the slider head has a channel that is open and constructed opposite to an entry direction of the workpiece carrier, wherein the channel constitutes a control surface along with the positioning roller rolls, and wherein the slider is raised against an initial tension causing the workpiece carrier to be decelerated.

14. The apparatus of claim 6, wherein the deceleration and acceleration device includes a deceleration element which hydraulically, pneumatically, or electromagnetically counters a travel motion of the workpiece carrier and decelerates the workpiece carrier.

15. The apparatus of claim 10, wherein the deceleration and acceleration device comprises a channel arranged in the slider head and open in a running direction of the workpiece carrier, wherein the channel comprises a slanted control surface, along which the positioning roller rolls upon lowering of the slider and accelerates the workpiece carrier.

16. The apparatus of claim 6, wherein the deceleration and acceleration device includes an acceleration element which acts on the workpiece carrier hydraulically, pneumatically, electromagnetically, and accelerates the workpiece carrier.

* * * * *